United States Patent [19]
Kundermann

[11] Patent Number: 5,699,887
[45] Date of Patent: Dec. 23, 1997

[54] HYDROKINETIC TORQUE CONVERTER WITH AN IMPELLER CLUTCH AND A BRIDGE COUPLING

[75] Inventor: Wolfgang Kundermann, Schweinfurt, Germany

[73] Assignee: Fichtel & Sachs AG, Schweinfurt, Germany

[21] Appl. No.: 613,466

[22] Filed: Mar. 11, 1996

[30] Foreign Application Priority Data

Mar. 10, 1995 [DE] Germany .................. 195 08 613.9

[51] Int. Cl.$^6$ .............................. F16H 61/62; F16H 45/02
[52] U.S. Cl. .................... 192/3.26; 192/3.3; 192/3.33
[58] Field of Search .................... 192/3.25, 3.26, 192/3.27, 3.29, 3.3, 3.33

[56] References Cited

U.S. PATENT DOCUMENTS

| | | | |
|---|---|---|---|
| 3,189,144 | 6/1965 | Gabriel | 192/3.29 |
| 4,934,495 | 6/1990 | Lemon | 192/3.26 |

FOREIGN PATENT DOCUMENTS 29 43 462 C2  8/1983  Germany .
2-203078  8/1990  Japan .

*Primary Examiner*—Richard M. Lorence
*Attorney, Agent, or Firm*—Cohen, Pontani, Lieberman & Pavane

[57] ABSTRACT

A hydrokinetic torque converter has a main impeller driven by an internal combustion engine, an auxiliary impeller that can be engaged into drive connection with the main impeller by an impeller clutch, a turbine coupled to an output shaft, and a stator which together form a converter circuit filled with hydraulic fluid. The impeller clutch has a clutch member that engages with the auxiliary impeller in a rigid, non-rotatable fashion. The clutch member forms the separating wall between two chambers, each of which is connected by at least one fluid flow passage to an associated hydraulic line, which leads to a supply system and acts depending on its operating state, as an inflow or outflow line creating a pressure gradient between the chambers. Based on the pressure gradient the clutch member can be set in either a first position, in which it is connected in rotary fashion to the converter housing, or in a second position, in which this rotary connection is released.

32 Claims, 5 Drawing Sheets

HYDROKINETIC TORQUE CONVERTER WITH AN IMPELLER CLUTCH AND A BRIDGE COUPLING

BACKGROUND OF THE INVENTION

1. Field of the Invention

The present invention relates to a hydrokinetic torque converter and more specifically to a hydrokinetic torque converter having a moveable plunger for controlling the engagement and disengagement of the impeller clutch and a coupling member for an auxiliary impeller.

2. Description of the Prior Art

From DE 29 43 462 C2, a hydrokinetic torque converter is known that has a first impeller driven by an internal combustion engine, a second or auxiliary impeller that can be placed into non-rotary or direct drive connection with the first impeller through a clutch member of an impeller clutch, a turbine connected to an output shaft, and a stator, which together form a torus circuit filled with hydraulic fluid. The aforementioned impeller clutch works in response to centrifugal force.

By providing a hydrokinetic torque converter with two impellers, one of which can be engaged and disengaged relative to the other, it becomes possible to change the converter characteristic. For example, when the impeller clutch is open and the auxiliary impeller is therefore inactive, it is possible, because of a more flexible converter characteristic, to achieve better revving-up of a cold engine as well as reduced drag when the vehicle stops with the engine running and in gear; on the other hand, when the impeller clutch is engaged and the auxiliary impeller is active, a more rigid converter characteristic is realized, which permits reduced slippage during driving and thus reduced fuel consumption. However, the fact that switching the impeller clutch from one state into the other and thus changing the converter characteristic is accomplished in response to centrifugal force, i.e., in a manner rigidly bound to a certain speed, is disadvantageous. Furthermore, clutches that operate in response to centrifugal force, as is also the case for the subject matter of the discussed German patent, are structurally complex, which significantly increases manufacturing expenses and the cost of the hydrokinetic torque converter.

SUMMARY OF THE INVENTION

It is an object of the present invention to further develop a hydrokinetic torque converter in such a way that the converter characteristic can be changed at a freely predeterminable operating phase.

This object is attained according to the present invention by arranging the clutch member of the impeller clutch between two chambers, each of which is attached through at least one fluid passage to an associated hydraulic line. By these hydraulic lines, which are in turn attached to a supply system, it is possible to establish in at least one of these chambers a higher pressure than in the other respective chamber, so that the clutch member executes an deflection movement under the influence of this pressure gradient. As soon as the clutch member frictionally engages the converter housing the clutch member participates in its movement and is able, because of its connection to the auxiliary impeller and its function as an impeller clutch, to drive the auxiliary impeller, by transmitting the movement of the converter housing and thus of the first impeller to the auxiliary impeller. As a result, as explained above, a more rigid converter characteristic is achieved. To change to the more flexible converter characteristic by nullifying the influence of the impeller clutch, another hydraulic line and thus the chamber on the opposite side of the clutch member is subjected to hydraulic fluid by the supply system, resulting in the release of the clutch member from the converter housing and thus a loss of the rotary drive at the clutch member.

As mentioned above, the more rigid converter characteristic that can be attained by engaging the auxiliary impeller makes it possible to reduce fuel consumption while driving; specifically, at all times when slip is present between the drive side and the output side of the torque converter. Further reduction in fuel consumption can be achieved by keeping this slip phase as brief as possible and then activating the plunger of a bridge coupling, so that the turbine wheel is driven in a slip-free manner by the converter housing. According to the present invention the impeller clutch is operatively connected to the bridge coupling because one of the chambers that cooperates with the clutch member, namely the chamber facing toward the converter circuit, is bordered on the side facing the converter circuit by the plunger of the bridge coupling. This leads to the following switch combination:

When both chambers are subjected to hydraulic fluid, the plunger of the bridge coupling is moved in the direction of the converter circuit; specifically, preferably, until reaching an axial stop. The pressure which builds up in the chamber nearer to the converter circuit is lower than the pressure in the chamber on the other side of the clutch member, resulting in a pressure gradient, which causes the clutch member of the impeller clutch to move in the direction of the converter circuit, until it also comes to rest on its own axial stop and thus causes the separation of this clutch member from the converter housing. As a result, the torque converter operates with a flexible converter characteristic and without the bridge coupling, i.e., suitably for phases in which the vehicle is stopped and for a start-up or acceleration.

In a next step, during driving, the chamber that is located between the converter housing and the clutch member of the impeller clutch is no longer subjected to hydraulic fluid, so that a pressure gradient forms relative to the chamber on the other side of the clutch member and the plunger of the bridge coupling remains at rest against its axial stop, while the clutch member of the impeller clutch moves away from its axial stop until it frictionally engages on the converter housing. The torque converter then switches over to the more rigid converter characteristic, but still continues to run without the bridge coupling.

During faster driving, the bridge coupling must be activated; specifically, by no longer subjecting either chamber to hydraulic fluid, so that only the hydraulic fluid located in the converter circuit acts as a pressure medium, deflecting the plunger of the bridge coupling toward the clutch member of the impeller clutch and thus toward the converter housing until, specifically, the plunger of the bridge coupling frictionally engages the clutch member of the impeller clutch. To avoid unnecessary friction slip between the plunger of the bridge coupling and the clutch member of the impeller clutch when there is relative axial movement, the connection between the two components is preferably rigid or non-rotatable.

Preferably a plurality of hydraulic lines is provided, so that each of the chambers can be individually subjected to hydraulic fluid and so that hydraulic lines are available for the inflow as well as for the backflow. The individual hydraulic lines are preferably arranged coaxially relative to one another, so that they can preferably be located around the converter rotational axis in a space-saving manner. At least one of these hydraulic lines is formed in the output shaft of the torque converter, so that hydraulic fluid can preferably be supplied in the area of the converter rotational axis and can then be fed into the particular chamber through the fluid passages. Preferably, each of the hydraulic lines opens into a chamber in which hydraulic fluid can collect before flowing into an fluid passage associated with this chamber. Advantageously, a chamber of this type, in which an overpressure is established when hydraulic fluid is supplied, is provided on one side of a control plunger, which can be deflected by a pressure gradient and can thus, through its guide channel, connect or disconnect at least one of the fluid passages to or from the chamber subjected to hydraulic fluid. The control plunger is deflected out of its rest position against the action of a energy storage device, preferably in the form of a spring, and which can be located in a second chamber on the other side of the control plunger, which can be supplied with hydraulic fluid by another hydraulic line. To move the control plunger back into its rest position, in which it rests against a stop, the latter chamber is pressurized by the supply of hydraulic fluid, while the former chamber is relieved of pressure by switching the associated hydraulic line to backflow. The movement of the control plunger back into its rest position is supported by the energy storage device.

The component splined to the converter housing can be, for example, the housing hub of the torque converter, in which are provided, preferably, the fluid passages between individual hydraulic lines and the associated chambers for pressuring the clutch member of the impeller clutch or of the plunger of the bridge coupling. The plunger is preferably arranged in an axially movable fashion on the converter hub. The clutch member has, for the purpose of connection to the converter housing, at least one friction surface facing the converter housing. The friction surface can directly frictionally engage the converter housing. In this case, it is advantageous to rotatably mount the clutch member on the converter housing. This is preferably done by a bearing bush, which can have the aforementioned axial stop for the clutch member. However, it is also conceivable for the friction surface on the side of the clutch member facing the converter housing to engage the converter housing by a lamella, which is connected in non-rotatable fashion to the extension on the auxiliary impeller and has a second friction surface on its other side with which it can engage the converter housing. A clutch member of this type is arranged in a non-rotatable fashion on the converter housing so that the bearing bush can be omitted.

The clutch member can be engaged on its side facing the converter circuit with a friction surface, which can be placed into operative connection with the plunger of the bridge coupling. In a manner known for bridge couplings, this can be done by having the plunger of the bridge coupling engage directly with the clutch member or, following the intermediate connection of a lamella connected to the turbine and a further friction surface held thereon, engage the latter.

A non-rotatable or rigid connection is formed between the clutch member of the impeller clutch and the auxiliary impeller, so that the latter can synchronously follow a turning of the clutch member when there is frictional engagement with the converter housing. This connection is a projection that extends around the bridge coupling in a ring-shaped fashion.

A seal is provided to protect the individual hydraulic lines from an overflow of hydraulic fluid located therein into the respective other hydraulic line; specifically, between the non-rotatable component preferably formed by the housing hub of the converter housing and the turbine hub. This non-rotatable component, for its part, is provided for the purpose of centering and sealing the output shaft of the torque converter. Preferably the auxiliary impeller is arranged on the main impeller in a low-friction manner by a roller bearing.

Advantageously the hydraulic lines activate both the clutch member of the impeller clutch as well as the plunger of the bridge coupling almost without additional technical expense. Essentially, there are existing hydraulic lines of a torque converter available to subject the respective chambers to hydraulic fluid, so that only supplementary hydraulic lines, for example, in the central chamber of the output shaft as well as fluid passages between the chambers and a chamber associated with one of the further hydraulic line must be provided.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE PRESENTLY PREFERRED EMBODIMENTS

Figure 1:
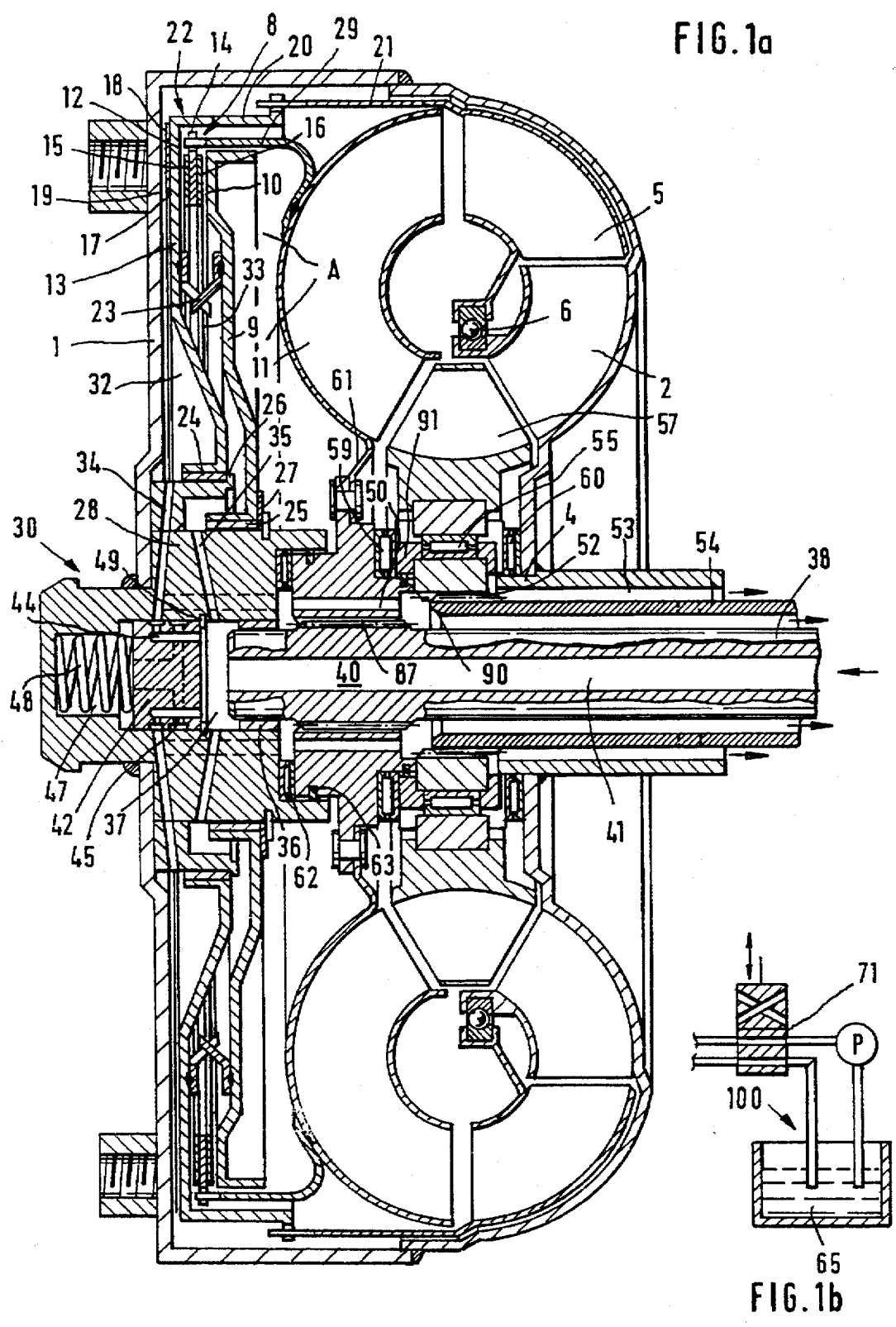
FIG. 1(a) is a longitudinal sectional view through a torque converter with two impellers, an impeller clutch, a bridge coupling and hydraulic lines for controlling the couplings, shown with inactive impeller clutch and bridge coupling.
FIG. 1(b) is a schematic view of a hydraulic fluid reservoir and reversing valve.

FIG. 1a shows a hydrokinetic torque converter comprising a converter housing 1, which is formed on the output side as the first or main impeller 2 and opens into a sleeve shaft 4, which is mounted in a gear (not shown) and drives a pump P (FIG. 1b) of a supply system 100, in order to supply the torque converter with hydraulic fluid, preferably oil. The converter housing 1 is provided with a second or auxiliary impeller 5, which is arranged through the roll bearing 6 on the main impeller 2 so as to be movable relative to the latter and has an extension 21, which protrudes in the direction of the torus circuit of the torque converter and rigidly engages an axial projection 20 of a clutch element 13 of an impeller clutch 22, described in greater detail below. The converter housing 1 further includes a bridge coupling 8, which has a plunger 9. The latter has on its outer circumference a radial area 10, which extends parallel to a radial area 12 of the clutch member 13. Between the plunger 9 and the clutch member 13 there is a friction surface support member in form of a lamella 14, which carries on both of its sides friction surfaces 15, 16 and can be brought through these surfaces into frictional engagement with the areas 10 and 12 of the converter—elements plunger 9 and clutch member 13.

The protrusion 14 extends radially outwardly over the outside of the plunger 9 and is attached to the outer shell of a turbine 11 in a non-rotatable but axially movable fashion. The plunger 9, in turn, is arranged by a bearing bush 25 in a rotatable and axially movable fashion on a housing hub 28, which is attached to a fixed or non-rotatable component 30 of the converter housing 1. The bearing bush 25 is provided with an axial stop 27 for the plunger 9.

The aforementioned friction surface 15 of the bridge coupling 8 can be brought to rest with its friction surface on a radial area 17 of the clutch member 13. The clutch member 13, on its side facing away from the friction surface 15, is provided with a friction surface 18, by which it can be brought into frictional engagement on a radial area 19 of the converter housing 1. The clutch member 13 is arranged by a bearing bush 24 on the housing hub 28 in a rotatable and axially movable manner, whereby the bearing bush 24 has an associated axial stop for the clutch member 13.

The converter housing 1 and the clutch member 13, define a first chamber 32, while a second chamber 33 is formed between the clutch member 13 and the plunger 9. The two chambers 32,33 are connected to one another in a non-rotatable manner by a locking member 23. The first chamber 32 is connected by fluid passage 34, preferably in the form of channels, to fluid flow passages 44 formed in a control plunger 42. The control plunger 42, which is movable in the axial direction of the torque converter, is arranged in an axial center bore of the housing hub 28 and borders at one end on a space 37, in which the output shaft 38 of the torque converter ends. A stop 49 formed by a safety ring extending into the housing hub 28 limits the motion of the plunger 42. The free end of the output shaft 38 is guided by a bearing 36 in the housing hub 28 and has a central axial bore 40, which serves as the first hydraulic line 41 and can be operatively connected to the second chamber 33 between the plunger 9 and the clutch member 13 by the chamber 37 as well as through a fluid passage 35, which can be designed in the form of channels, provided in the housing hub 28.

The side of the control plunger 42 facing away from the output shaft 38, abuts chamber 47, in which an energy storing device such as a compression spring is disposed exerting a pushing force into the direction of the stop 49. A second hydraulic line 50 formed in the housing hub 28 is connected to chamber 47 by guide channels 45 formed in the control plunger 42. The second hydraulic line 50 is connected by a toothing 52, which ensures a turning lock, to a further hydraulic line 53 provided between the sleeve shaft 4 and a support shaft 54. The support shaft 54 is arranged radially between the sleeve shaft 4 and the output shaft 38 and carries roller elements 55 for the stator 57. The stator 57 rests in the axial direction on both sides on the respective bearing elements 59, 60 first, relative to the converter housing 1 and, secondly, relative to the turbine hub 61. A further bearing element 62 operative in the axial direction is arranged between the drive-side end of the turbine hub 61 and the housing hub 28. The bearing element 62 is associated with a seal 63 in the form of a ring recessed into the turbine hub 61. The seal 63 prevents an overflow of hydraulic fluid from the converter circuit into the hydraulic line 50 by the bearing element 62. The same purpose is served by a further seal 90, which is operative radially between the turbine hub 61 and a pressure disk 91 connected in a non-rotatable fashion to the outer roll of the roller element 55. Hydraulic fluid from the converter circuit can therefore only pass into the hydraulic line 53 by the bearing element 60 and the roller element 55. Like the hydraulic lines 41 and 50, the line 53 can be connected through a reversing valve 71 to a pump P, with which is associated a reservoir 65 for converter fluid (FIG. 1b).

The torque converter functions as follows:

In the position of the reversing valve 71 depicted in FIG. 1b, the hydraulic fluid is fed into the hydraulic line 41 at a relatively low pressure, for example, at 50% of the maximum pressure. After the emergence of the hydraulic fluid at the free end of the output shaft 38, the pressure in the chamber 37 is lower than the counter-force or pressure in the chamber 47, which effectively results from the pressure of the hydraulic fluid located in chamber 47 and the axial force exerted by the energy storing device 48. As a result, the control plunger 42 remains in its rest position (shown in FIG. 1a), in which the hydraulic fluid that has passed into the chamber 37 first flows into the chamber 32 through the fluid flow passage 44 of the control plunger 42 and the fluid passage 34 and also passes into the chamber 33 on a direct path through fluid passage 35. As a consequence, a higher pressure is built up in the respective chambers 32 and 33 than in space A of the converter circuit, so that the plunger 9 of the bridge coupling 8 is moved by the overpressure in chamber 33 against the axial stop 27, and the clutch member 13 of the impeller clutch 22 is moved by the overpressure in chamber 32 against the axial stop 26. In this position, the plunger 9 is separated from the clutch member 13, so that the effect of bridge coupling 8 is nullified, and the clutch member 13 moves back from the converter housing 1, so that there is no drive of the auxiliary impeller 5 by the axial projection 20 of the clutch member 13 and the extension 21. As a result, the torque converter operates with a soft converter characteristic, which is advantageous, preferably, when the vehicle is stopped or is accelerated.

Figure 2:
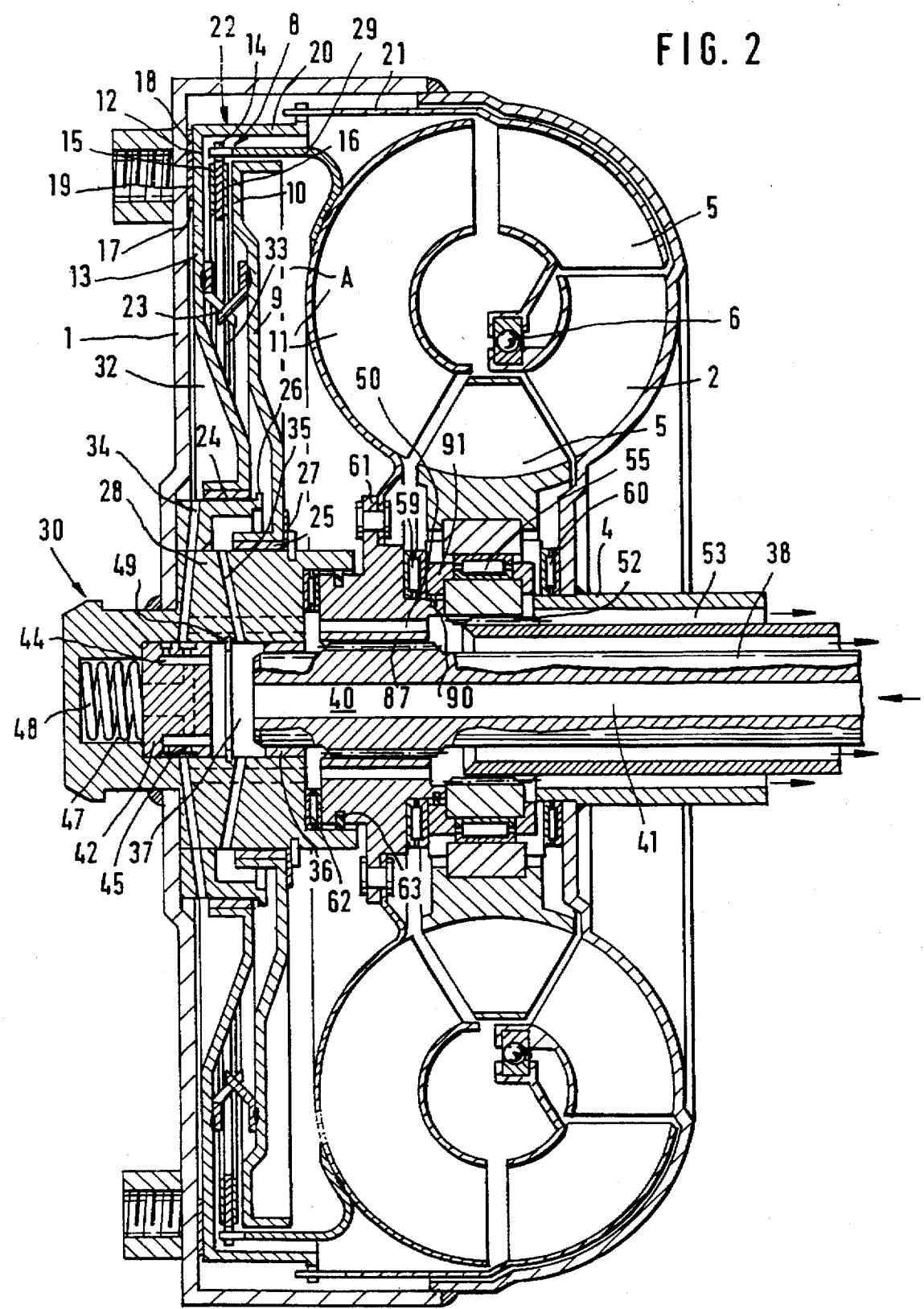
FIG. 2 shows FIG. 1(a), but with an active impeller clutch.
Figure 3:
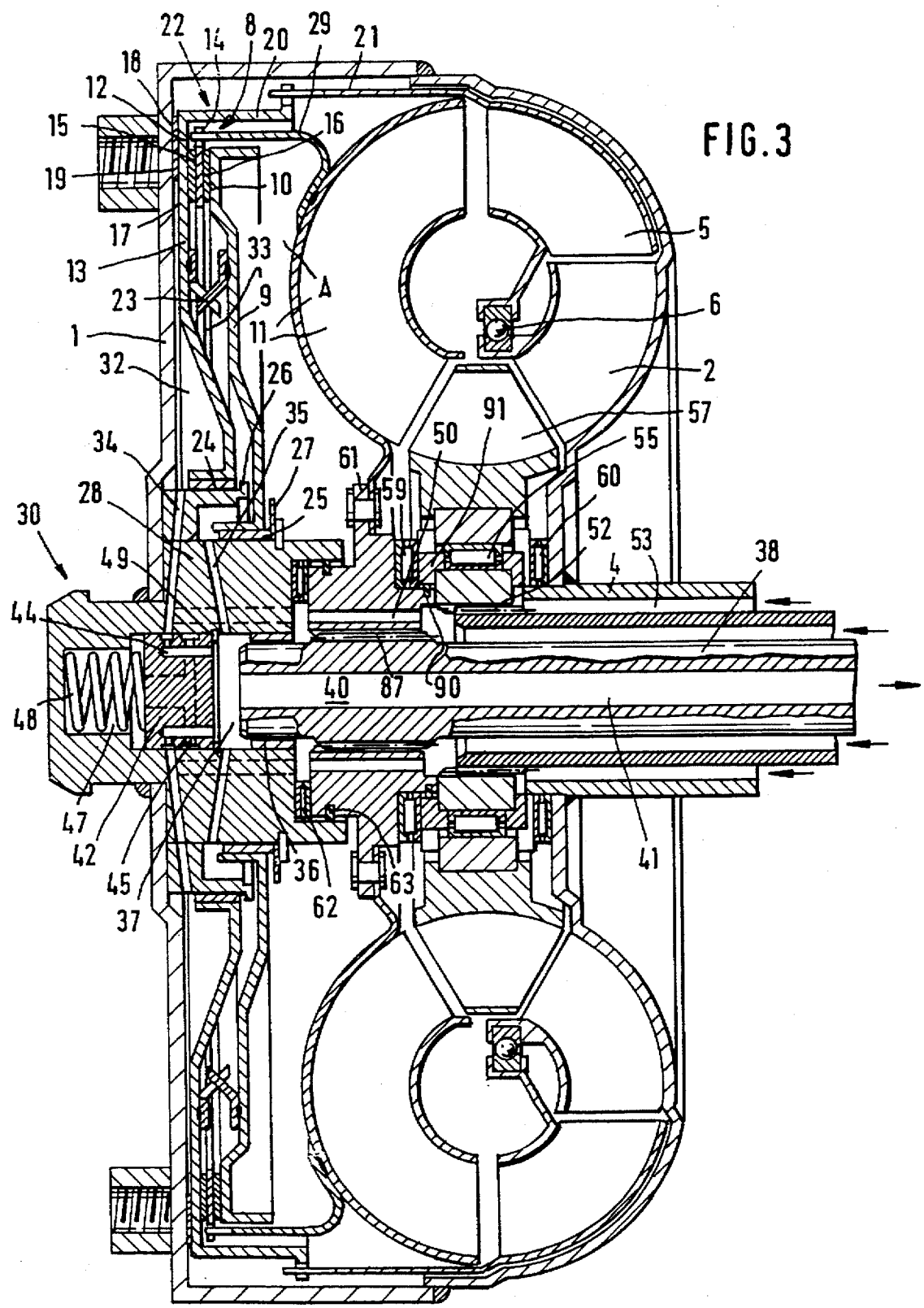
FIG. 3 shows FIG. 1(a), but with an active impeller clutch and bridge coupling.

The torque converter is switched over to the more rigid converter characteristic as follows: the pressure exerted by the pump P on the hydraulic fluid by the reversing valve 71 is increased to such an extent that the pressure built up in chamber 37 exceeds the counter-force in chamber 47 and accordingly deflects the control plunger 42 out of its rest position on the stop 49 in the direction of the energy storing device 48 while deforming the same (FIG. 2). As a result, the fluid flow passages 44 of the control plunger 42 are disconnected from the fluid passage 34 in the housing hub 28, so that the chamber 32 associated with the fluid passage 34 becomes unpressurized. On the other hand, hydraulic fluid flows at a high pressure through the fluid passage 35 into the chamber 33, in which, compared to chamber 32 and to space A of the converter circuit, an overpressure is generated. As a result, the clutch element 13 is pushed in the direction of the converter housing 1; specifically, in such a way that the friction surface 18 arranged in the area 17 of the clutch member 13 comes into frictional engagement with the area 19 of the converter housing 1. In consequence, the rotational movement of the converter housing 1 is transmitted to the clutch member 13 and, because of the non-rotational or rigid connection of the latter to the auxiliary impeller 5, to the latter through the projection 20 and the extension 21. At the same time, because of the overpressure in chamber 33 relative to space A of the converter circuit, the plunger 9 of the bridge coupling 8 continues to be held against its stop 27, so that the bridge coupling 8 remains inactive. For driving at higher speed, it is advantageous for reasons of fuel consumption to close the bridge coupling 8 (FIG. 3). For this purpose, the reversing valve 71 is moved into a different position, in which the hydraulic line 41 in the output shaft 38 becomes free of pressure, while the hydraulic lines 50 and 53 are supplied with hydraulic fluid by the pump P. On the one hand, the hydraulic fluid flows into the converter circuit to space A through the hydraulic line between the bearing element 60 and the roller element 55; on the other hand, the fluid flows into the hydraulic line 50 through the toothing 52. Due to the low pressure force in chamber 37, the control plunger 42 returns to its rest position, in which it is located at rest against the stop 49. This backward movement is made possible, first by the energy storing device 48, which is able to relax in the pressure-free space 37; secondly, however, the backward movement is made possible by an increased pressure in space 47 due to the hydraulic fluid supplied through the hydraulic line 50 and fed through the fluid flow passages 45 in the control plunger 42 into the chamber 48. This pressurization of the hydraulic lines ensures that higher pressure is generated in space A than in chambers 33 and 32, so that the plunger 9, under the effect of the overpressure in space A, is released from its stop 27 and moves in the direction of the clutch member 13. At the same time, the higher pressure in space A is applied to the side of the clutch member 13 facing space A, as a result of which the clutch member continues to be frictionally engaged with the converter housing 1 by the friction surface 18. On the one hand, the movement of the converter housing is now transmitted to the auxiliary impeller 5 by the friction surface 18 and the clutch member 13; on the other hand it is transmitted to the lamella or rib 14 by the friction surfaces 15 and 16, and from the lamella 14 to the turbine 11 by the rigid arm 29, and from the turbine to the output shaft 38 through the turbine hub 61, which is in rotary engagement with the output shaft 38 through a toothing 87.

Figure 4:
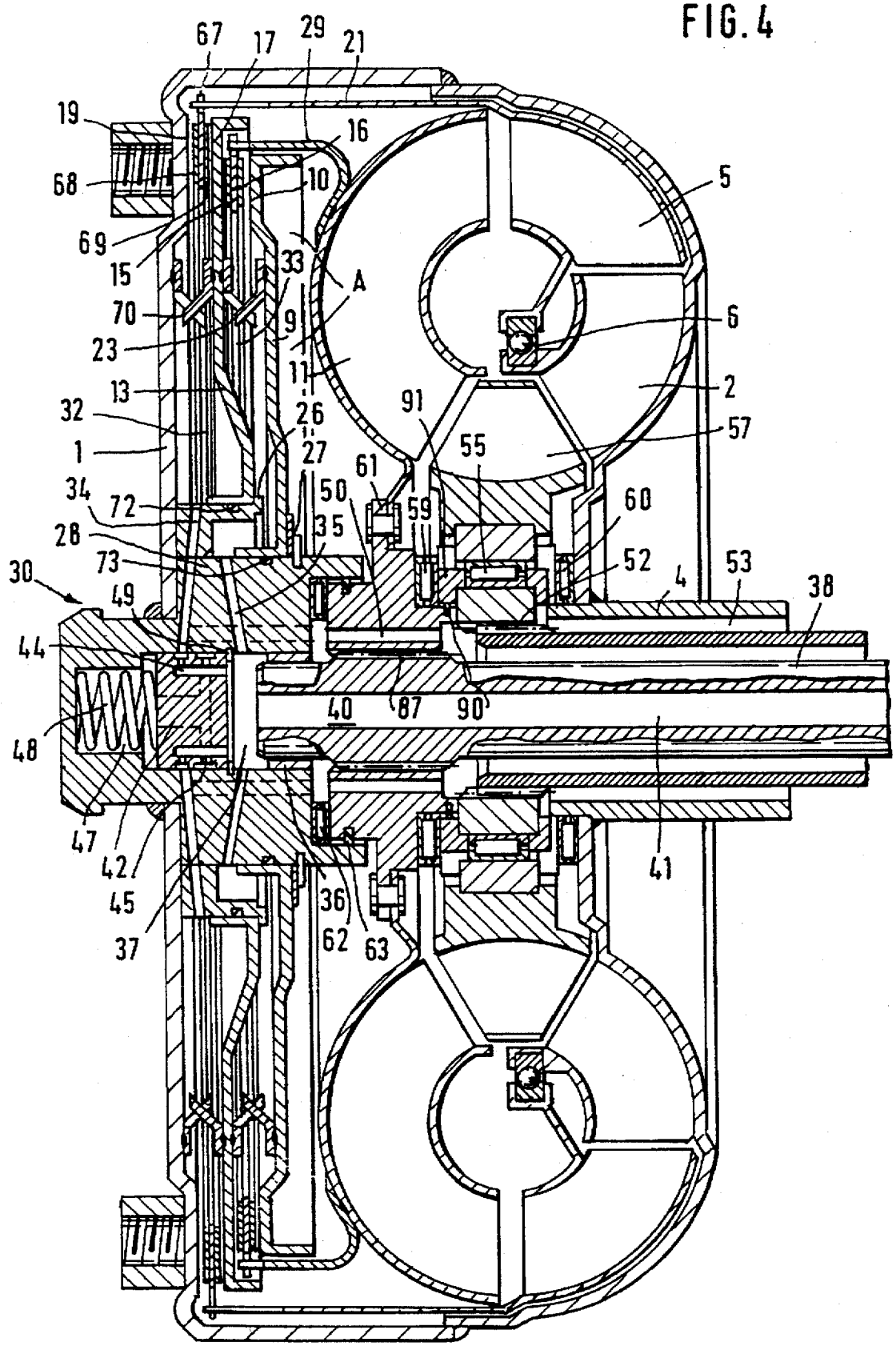
FIG. 4 shows FIG. 1(a), but with the impeller clutch engaging the converter housing by a lamella with multiple friction surfaces.

The torque converter shown in FIG. 4 differs from that shown in FIG. 1a in that the radial area 17 of the clutch member 13 is designed without a friction surface. Instead, a second lamella or rib 67, which carries the respective friction surfaces 68, 69 on its two sides, is located axially between the area 17 of the clutch member 13 and the area 19 of the converter housing 1. The lamella 67 is held in a non-rotatable or rigid but axially movable fashion on the extension 21 of the auxiliary impeller 5, so that when the clutch member 13 moves axially in the direction of the lamella 67, the friction surface 68 frictionally engages the area 19 of the converter housing 1 and the friction surface 69 frictionally engages the area 17 of the clutch member 13. Unlike in the embodiment of FIG. 1a, both the clutch member 13 and the plunger 9 are now held in an axially movable but non-rotatable or rigid fashion directly on the housing hub 28 and ensure, in connection with the respective sealing elements 72, 73, the sealing off of the respective chambers 32, 33. The rigid or direct connection of the clutch member 13 and the plunger 9 on the housing hub 28 ensures not only that these two converter elements are non-rotatable relative to one another, but also that there is no movement relative to the converter housing 1. Between the latter and the clutch member 13, a second locking member 70 is provided, in addition to the first locking member 23 between the clutch member 13 and the plunger 9.

Figures 5A, 5B:
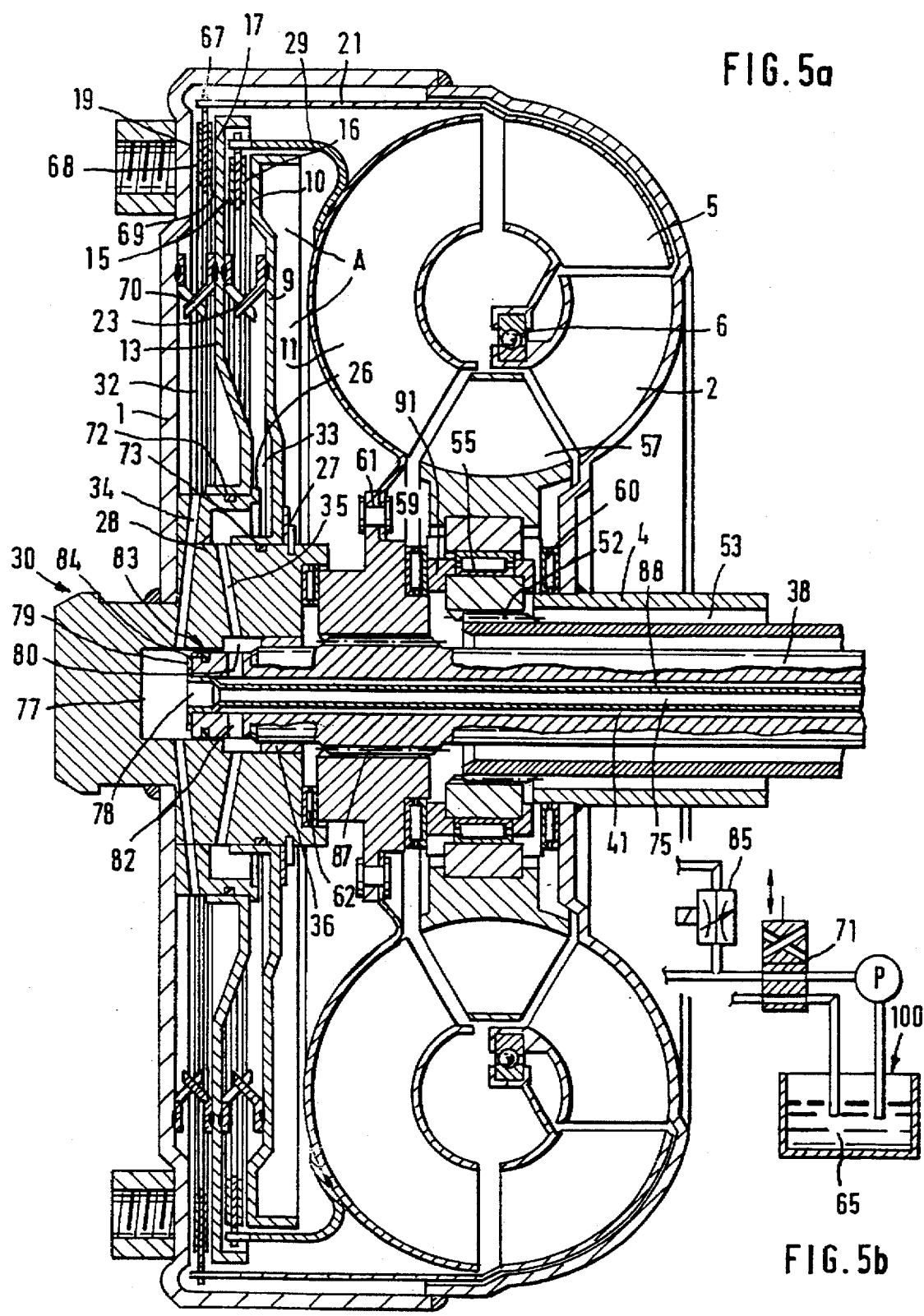
FIG. 5(a) shows FIG. 4, but with an additional hydraulic line in the output shaft of the torque converter.
FIG. 5(b) is a schematic view of a hydraulic fluid reservoir with reversing valve and throttle.

FIG. 5a shows an embodiment of a torque converter that corresponds to that shown in FIG. 4 except in the area in which the output shaft 38 is arranged. The deviating part of this torque converter will therefore be discussed below only briefly. In this embodiment, the output shaft 38 is provided with a second hydraulic line 75, which is disposed coaxially within the hydraulic line 41 already described and can be installed by placing a thin-walled cylindrical tube 88 into the hydraulic line 41. The tube 88 has an enlarged portion 78 at its outflow region into a chamber 77 located on the drive side of the housing hub 28 of the converter housing 1 and is supported by a flange 79 extending radially outward on the associated end of the output shaft 38. The fluid passage 34 opens into the chamber 77, while the fluid passage 35 leads to a second chamber 80 that radially surrounds the output shaft 38 and is connected through radial passages 82 to the hydraulic line 41.

The embodiment of FIGS. 5a and 5b functions as follows: Both the radially-inner hydraulic line 75 and the radially-outer hydraulic line 41 can be supplied with hydraulic fluid when the reversing valve 71 (FIG. 5b) is in the appropriate position. Both hydraulic lines are supplied with hydraulic fluid, which flows from the hydraulic line 75 through the chamber 77 and the flow passage 34 into the chamber 32, as well as from the hydraulic line 41 through the passages 82, the chamber 80 and the flow passage 35 into the chamber 33. As a result, an overpressure is generated in both chamber 32 and chamber 33 relative to space A of the converter circuit, causing the clutch member 13 and the plunger 9 to come to rest on the respective associated axial stops 26, 27. As already discussed in detail, the auxiliary impeller 5 is disconnected from the main impeller 2 in this operating position of the torque converter, and the bridge coupling 8 is inactive. To connect the auxiliary impeller to the main impeller, either the pressure in the radially-outer hydraulic line 41 is increased or the pressure in the radially-inner hydraulic line 75 is nullified, so that a higher pressure level builds up in chamber 33 than in chamber 32. The consequence of this is a frictional engagement between the clutch member 13 and the converter housing 1 and thus a driven connection of the auxiliary impeller 5.

The pressure difference in the hydraulic lines 41, 75 is created for example, by connecting the hydraulic line 41 directly to the pump P, while the hydraulic line 75 is attached to the pump P via a switchable throttle 85.

Turning off the flow to the two hydraulic lines 41, 75 and supplying the hydraulic line 53 with hydraulic fluid ensures that the pressure in space A of the converter circuit is higher than in the chambers 32 and 33. In this way, along with the already activated impeller clutch 22, the bridge coupling 8 is also activated. The bearing 36, which is located between the housing hub 28 and the terminal portion of the output shaft 38, seals off the chamber 80 relative to space A. Similarly, to ensure the switching function, it is advantageous to arrange a seal 83 between the chamber 77 and the chamber 80. This seal 83 is formed by a seal element 84 which is radially extending into and projecting radially outward over the output shaft 38.

In respect to the torque converter shown in FIGS. 1a to 4, the expense of inserting an extra hydraulic line 75 into the output shaft 38 in this embodiment of the torque converters and the expense associated with the design of the radial passages 82 is offset by the omission of the movable control plunger 42 and the stop 49 for the rest position of the plunger and the energy storing device 48 for pressing the control plunger 42 against the stop 49. Therefore, in the embodiment according to FIG. 5a, the technical expense and, in particular, the number of movable parts is lower than in the torque converter shown in FIGS. 1a to 4.

The invention is not limited by the embodiments described above which are presented as examples only but can be modified in various ways within the scope of protection defined by the appended patent claims.

What is claimed is:

1. A hydrokinetic torque converter comprising: a converter housing (1); a first impeller (2) driven by an internal combustion engine, a second impeller (5), a turbine (11), and a stator (57) together forming a converter toms circuit filled with hydraulic fluid; an impeller clutch (22) comprising a clutch member (13) for placing said second impeller into non-rotatable drive connection with said first impeller; a first and second hydraulic line connected to a supply system; a first chamber (32) and a second chamber (33) within said converter housing (1) and separated by said clutch member (13); at least one fluid passage (34, 35) connecting a respective one of said chambers with a respective one of said hydraulic lines; means connected to at least one of said hydraulic lines for creating a pressure gradient between said first and second chambers for moving said clutch member (13) into a first position in which said clutch member is connected to said converter housing for rotation therewith and a second position in which said clutch member and said converter housing are disconnected from each other;

a component (30) including a housing hub (28) connected to said converter housing (1); a control plunger (42) disposed within said housing hub (28) in fluid communication with said hydraulic lines and said first and second chambers (32, 33); said control plunger (42) comprising at least one fluid flow passage (44, 45) and being mounted so as to move out of a first rest position into a second fluid connection position with said first hydraulic line in which the hydraulic fluid flows through said fluid flow passage in a direction and said second hydraulic line in which the hydraulic fluid flows in an opposite direction.

2. The hydrokinetic torque converter according to claim 1, additionally comprising a bridge coupling (8) connected to said turbine (11) and including a plunger (9); said second chamber (33) facing toward said converter circuit being bordered on one side by said clutch member (13) and on the other side by said plunger (9).

3. The hydrokinetic torque converter according to claim 2, wherein said clutch member (13) is non-rotatably connected to said plunger (9) of said bridge coupling (8).

4. The hydrokinetic torque converter according to claim 1, wherein said hydraulic lines are disposed coaxially relative to one another.

5. The hydrokinetic torque converter according to claim 4, additionally comprising an output shaft (38) connected to said turbine (11); said first hydraulic line being axially disposed within said output shaft (38).

6. The hydrokinetic torque converter according to claim 1, additionally comprising a supply system and a first and second pressure chamber connected to a respective one of said first and second hydraulic lines at an end facing away from said supply system and being connected to at least one of said chambers (32, 33) through said fluid passage (34, 35).

7. The hydrokinetic torque converter according to claim 1, additionally comprising an energy storing device (48) exerting a force against said control plunger (42) when moving out of said rest position.

8. The hydrokinetic torque converter according to claim 7, additionally comprising a stop (49) against which said control plunger (42) is held in said rest position by said energy storing device (48).

9. The hydrokinetic torque converter according to claim 1, wherein said clutch member (13) is formed by a plunger arranged in axially movable fashion on said component (30).

10. The hydrokinetic torque converter according to claim 1, wherein said clutch element (13) comprises at least one friction surface on its side facing away from the converter circuit for connecting said clutch member to said converter housing (1).

11. The hydrokinetic torque converter according to claim 10, wherein said friction surface is disposed for fictional engagement with said converter housing.

12. The hydrokinetic torque converter according to claim 1, additionally comprising a bearing bush (24) disposed on said component (30) for mounting said clutch member (13); and an axial stop (26) for said clutch member (13) disposed on said bearing bush (24).

13. The hydrokinetic torque converter according to claim 1, wherein said second impeller includes an extension 21 and a lamella (67) non-rotatably connected to said extension (21); said lamella comprising a first friction surface (69) facing said converter toms circuit and a second friction surface (68) for frictional engagement with said converter housing (1).

14. The hydrokinetic torque converter according to claim 13, wherein said clutch member (13) is arranged in non-rotatable fashion relative to said converter housing (1) on said component (30).

15. The hydrokinetic torque converter according to claim 1, additionally comprising a bridge coupling (8) disposed between said clutch member (13) and said plunger (9) and comprising a friction surface (15) for fictionally engaging said clutch member (13) at the side facing the converter circuit.

16. The hydrokinetic torque converter according to claim 1, wherein said clutch member (13) comprises a projection (20) axially extending toward the converter circuit and non-rotatably connected to said second impeller (5).

17. The hydrokinetic torque converter according to claim 16, additionally comprising a bridge coupling (8) disposed between said clutch member (13) and said plunger (9) and wherein said projection (20) extends around said bridge coupling (8) in ring-like fashion.

18. The hydrokinetic torque converter according to claim 1, additionally comprising a turbine hub (61) and a seal (63) separating said first and second hydraulic lines from one another between said housing hub (28) and said turbine hub (61).

19. The hydrokinetic torque converter according to claim 1, additionally comprising a bearing (36) disposed within said housing hub (28) for centering said output shaft (38); said bearing (36) sealing said first hydraulic line (41) disposed coaxially within said output shaft (38) from said second hydraulic line (50, 53) disposed concentric around said output shaft (38).

20. The hydrokinetic torque converter according to claim 1, additionally comprising a rolling bearing (6) for mounting said second impeller (5) on said first impeller (2).

21. The hydrokinetic torque converter according to claim 1, additionally comprising means for feeding hydraulic fluid from said supply system (100) through said second hydraulic line (50, 53) to said converter circuit.

22. A hydrokinetic torque converter comprising: a converter housing (1) mounted to a component (30) including a housing hub (28); a main impeller (2) driven by an internal combustion engine, an auxiliary impeller (5), a turbine (11) connected to an output shaft (38) and a stator together forming a converter toms circuit filled with hydraulic fluid from a supply system; first and second hydraulic lines in fluid communication with the supply system; said first hydraulic line being disposed coaxially within said output shaft; first and second chambers (32, 33) disposed within said converter housing (1); a fluid passage (34, 35) connecting said first and second chambers in fluid flow relationship to said coaxially disposed hydraulic line (41, 75); an impeller clutch (22) comprising a clutch member (13) for non-rotatably engaging said auxiliary impeller (5), said clutch member (13) separating said first and second chambers; a control plunger (42) disposed within said housing hub (28) in fluid communication with said hydraulic lines and said first and second chambers and comprising at least one fluid flow passage (44, 45); said control plunger being mounted so as to move out of a first rest position into a second fluid connection position with said first hydraulic line in which the hydraulic fluid flows through said fluid flow passage in a direction and said second hydraulic line in which the hydraulic fluid flows in an opposite direction.

23. The hydrokinetic torque converter according to claim 22, additionally comprising an energy storing device (48) exerting a force against said control plunger (42) when moving out of said rest position.

24. The hydrokinetic torque converter according to claim 23, additionally comprising a stop (49) against which said control plunger (42) is held in said rest position by said energy storing device (48).

25. The hydrokinetic torque converter according to claim 22, additionally comprising a bridge coupling (8) including a first plunger (9) at least in part defining said second chamber, said clutch member (13) being non-rotatably connected to said first plunger (9).

26. The hydrokinetic torque converter according to claim 22, additionally comprising a component (30) splined to said converter housing (1) and wherein said clutch member (13) is formed by a second plunger arranged in an axially movable fashion on said component.

27. The hydrokinetic torque converter of claim 26, additionally comprising a bearing bush (24) disposed on said component (30) for mounting said clutch member (13); and an axial stop (26) for said clutch member (13) disposed on said bearing bush (24).

28. The hydrokinetic torque converter according to claim 27, wherein said clutch member (13) is arranged in non-rotatable fashion relative to said converter housing (1) on said component (30).

29. The hydrokinetic torque converter according to claim 22, wherein said clutch member (13) comprises an axially extending extension (21) connected to said auxiliary impeller (5); a lamella (67) radially extending at the end of said extension between said clutch member (13) and said converter housing (1), said lamella having a side facing said converter toms circuit and an opposite side and a first friction surface at said toms circuit side and a second friction surface at said opposite side for engagement with said converter housing (1).

30. The hydrokinetic torque converter according to claim 22, additionally comprising a turbine hub (61) and a seal (63) separating said hydraulic lines from one another between said housing hub (28) and said turbine hub (61).

31. The hydrokinetic torque converter according to claim 22, additionally comprising a bearing (36) disposed within said housing hub (28) for centering said output shaft (38), said bearing (36) sealing said first hydraulic line (41) disposed coaxially within said output shaft (38) from said second hydraulic line (50, 53) disposed concentric around said output shaft (38).

32. The hydrokinetic torque converter according to claim 22, additionally comprising a rolling bearing (6) for mounting said auxiliary impeller (5) on said main impeller (2).

* * * * *